Feb. 19, 1957 V. H. SANNER 2,782,293
DEVICE FOR PREVENTING TUBE COLLAPSE IN TUBE MILLS
Filed Sept. 15, 1955 2 Sheets-Sheet 1

INVENTOR.
VERYL H. SANNER
BY Malcolm W. Fraser
ATTORNEY

Feb. 19, 1957 V. H. SANNER 2,782,293
DEVICE FOR PREVENTING TUBE COLLAPSE IN TUBE MILLS
Filed Sept. 15, 1955 2 Sheets-Sheet 2

INVENTOR.
VERYL H. SANNER
BY
ATTORNEY

United States Patent Office 2,782,293
Patented Feb. 19, 1957

2,782,293

DEVICE FOR PREVENTING TUBE COLLAPSE IN TUBE MILLS

Veryl H. Sanner, Toledo, Ohio, assignor to The Etna Machine Company, Toledo, Ohio, a corporation of Ohio Application September 15, 1955, Serial No. 534,462

6 Claims. (Cl. 219—59)

This invention relates to tube mills but particularly to such machines, which handle an endless metallic ribbon and gradually form the same into a tubular shape, the free edges of the tube being welded together as the formed tube advances.

Difficulty has heretofore been experienced in producing relatively thin-walled welded tubing, particularly when the metal is non-ferrous, such for example as aluminum, because of the difficulty of continuously and uniformly producing a weld which is free of porosity and also of tube collapse at the point of welding. This difficulty has resulted in the scrapping of many hundreds of feet of tubing and has been a continuous source of annoyance.

An object is to overcome the above difficulties and to produce a simple and efficient device for maintaining and supporting the tubing at the point of weld so that a uniformly satisfactory weld is achieved and the cylindrical form of the tube maintained.

Another object is to produce a plug or insert to fit inside of a tube as it is progressively formed and arranged at the point of welding and over which the tube advances, such plug or insert being so shaped and designed as to militate against tube collapse and to dispose the free edges of the tube which are to be welded, in such manner that a uniform weld free of porosity is maintained.

Other objects and advantages of the invention will hereinafter appear and for purposes of illustration but not of limitation, an embodiment of the invention is shown on the accompanying drawings, in which—

Figure 4:
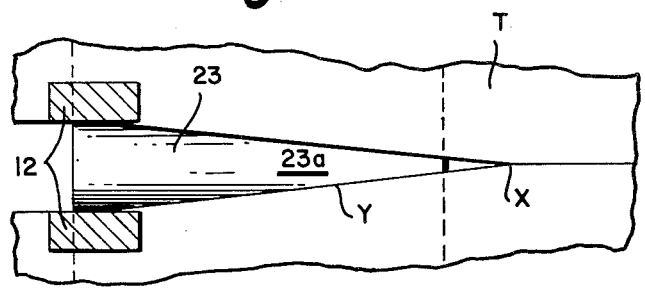
Figure 5:
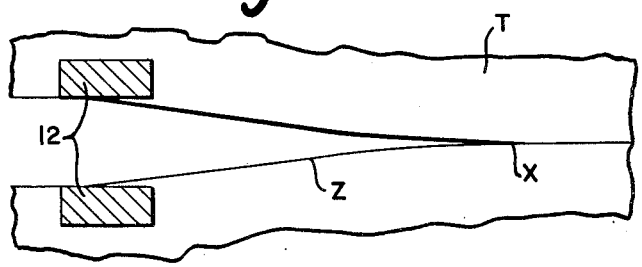

Figure 4 is a diagrammatic view showing the tube at the point of weld and showing the proper angle achieved by the use of the plug or insert in accordance with this invention whereby satisfactory weld is achieved and the liability of tube collapse obviated; and Figure 5 is a diagrammatic view similar to Figure 4 and showing what takes place without the use of the plug or insert and by which unsatisfactory welds are formed and tube collapse not infrequently occurs.

Figure 1:
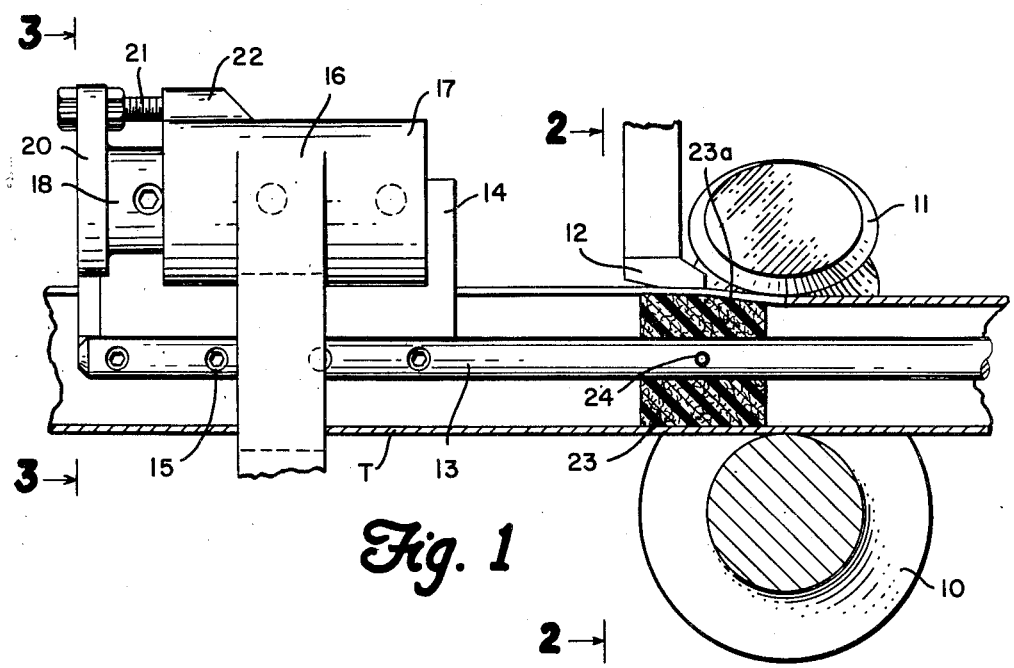
Figure 1 is a longitudinal sectional elevation of a portion of a tube mill, particularly that portion in the region of the welding step, only so much of the equipment being shown as is necessary for a showing of the salient features of this invention.
Figure 2:
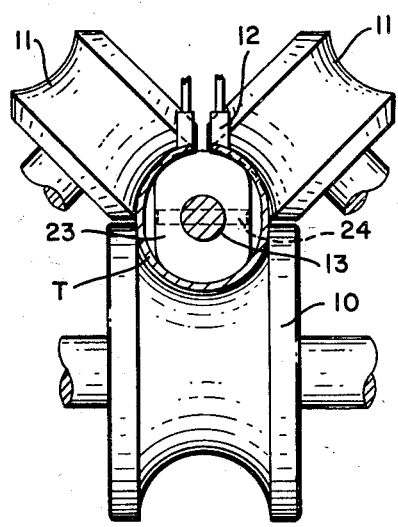
Figure 2 is a transverse sectional view substantially on the line 2—2 of Figure 1.

Referring particularly to Figures 1 and 2, 10 designates a lower pressure roll, above which is a pair of upper pressure rolls 11 on oppositely inclined axes. These rolls are arranged at the point of weld and, as will hereinafter appear, the rolls 10 and 11 not only hold the tube in the desired cylindrical shape but also squeeze together the free edges for enabling the weld to be effected, thereby to produce the continuously cylindrical seamed tubing. As will be readily understood by those skilled in the art, a series of rolls are provided for taking a strip of metallic ribbon and progressively forming it into tube form and at the same time advancing the tube during its formation. Thus the rolls 10 and 11 are only a portion of the rolls of the complete tube mill, there being a plurality of spaced sets of rolls in rear and additional rolls in advance of these rolls. However, since such structure forms no part of the present invention, further description and illustration are not deemed necessary.

The tube is indicated at T wherein the tube is shown at the left hand portion of Figure 1 as well as in Figure 2 with the free edges separated from each other. As the tube is advanced welding occurs in the region of the rolls 10 and 11 so that the portion of the tube at the extreme right of Figure 1 has been welded, thereby uniting the free edges of the tube.

Figure 3:
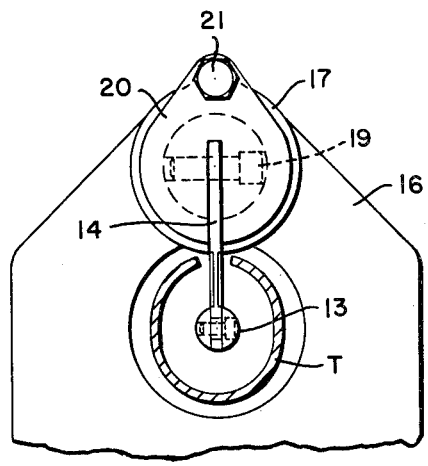
Figure 3 is a sectional view substantially on the line 3—3 of Figure 1.

As shown, electric current is delivered to the tube T by a pair of electrodes 12 which wipe over the tube as the latter is advanced and adjacent the free edges thereof, substantially as indicated on Figure 2. The source of current is not shown but ultra-high frequency current, in the region of radio frequency, is preferable and in practice has been found quite satisfactory for welding the seams of non-ferrous metals such as aluminum, copper or brass where there is less resistance to the current flow and as a consequence, the edges of the tube do not get as hot as, for example, in the case of steel tubing. It will be understood that the electrodes 12 are retained stationary and the tube T progressively and continuously advances. The electrodes 12, particularly as shown on Figure 3, are slightly in rear of the point where the edges of the tubing are brought into contact by the pressure rolls, thereby forming a V between the electrodes and the point of weld. The spacing between the electrodes and the point of weld varies in accordance with the rate of movement of the tubing, the particular metal being welded, wall thickness of the metal and other factors which need not be considered in detail here since they form no part of the present invention.

Extending longitudinally through a portion of the length of the tubing T and disposed substantially coaxially therewith is a rod 13 which, at its inner or rearward end is secured to a plate-like bracket 14 which projects upwardly through the space between the edges of the tube being formed. Thus it will be apparent that the bracket 14 is secured to and projects upwardly at substantially right angles to the rod 13. Arranged above the tube T is a stationary bracket 16 which is fixed to a suitable part of the machine frame (not shown). The bracket 16 has a cylinder 17 in which a piston 18 is slidable horizontally. Screws 19 secure the piston 18 to the upright plate-bracket 14. At the rear end of the piston 18 is a flange 20 which extends above the piston and carries an adjusting screw 21 which threadedly engages a boss 22 integral with and rising from the cylinder 17. Thus by adjusting the screw 21, the rod 13 can be moved axially of the tube T. The rod 13 may carry at its front end an inside scarfer (not shown) for scarfing the inside of the welded seam, as will readily be understood by those skilled in this art.

Disposed within the tube T and arranged just prior to the point of weld and the point where the pressure rolls 11 bring the edges of the tube into engagement with each other, is a plug 23 which is apertured to receive the rod 13 and to which it is secured by a transverse pin 24. The plug or insert 23 has flat vertical walls, as indicated on Figure 2 and rounded top and bottom walls conforming to the curvature of the tube T. As indicated at 23a the forward edge portion of the top wall of the plug 23 inclines forwardly and downwardly to conform with the inclination of that portion of the tube T created when the squeeze or pressure is exerted by the rolls 11 upon the tube to bring the edges into contact with each other. Thus the plug 23 may occupy the major portion of the distance between the electrodes 12 and the point of juncture of the tube edges. Preferably the plug 23 is of electrical non-conductive material and of a material over which the tube T can pass freely so that the frictional contact is reduced as much as possible. One satisfactory material for the plug is wood fibers bonded together by a phenolic resin. Suitable resins for this purpose are those known in the trade as Micarta, Celleron and Synthane. Manifestly the axial adjustment of the rod 13 is such as to control the angle formed by the edges of the tube and the point of juncture. This angle can be increased or widened by forwardly moving the plug 23 or reduced by a rearward or movement of the plug 23 to the left of Figure 1.

When the tube is of relatively thin wall, it is manifest that any substantial pressure exerted upon the tube at the point of weld will distort the walls of the tube, or collapse them and militate against the edges being brought together in proper contact for welding operation. By the use of the plug or insert 23 radial pressure may be exerted against the tube at the point of weld without tube collapse. It is found that with a tube of a 4" diameter and with a wall thickness of .065", a 2° angle for the upper surface 23a of the plug is satisfactory. Thus an important function of the plug is to maintain the angle of the tubing just prior to the welding operation at the proper degree. If the correct angle is not maintained, a porous weld results because of the fluctuating heat created adjacent the point of pressure. Manifestly, such angularity will vary with the size of the tube but so long as the relative proportions of the tube wall thickness, diameter and angularity as above indicated are observed, satisfactory results are achieved.

Figure 4 diagrammatically illustrates the beneficial results achieved by the use of the plug 23 as above described. It will be noted that between the electrodes 12 and the point $x$, which is the point of pressure, the free edges of the tube T are straight as indicated by the lines $y$. On the other hand, Figure 5 illustrates what takes place when the plug 23 is not employed. In this case, note that there is a curvature in the line between the electrodes 12 and the point of pressure $x$, as indicated by the lines $z$. Since the current from the electrodes passes along these lines to the point of pressure in order to complete the circuit, the curved lines $z$ result in creating a fluctuating heat near the point of pressure $x$. This is objectionable and results in the formation of unsatisfactory welds, which are in the main porous.

Numerous changes in details of construction, arrangement and choice of materials may be effected without departing from the spirit of the invention, especially as defined in the appended claims.

What I claim is:

1. In a tube mill for progressively forming a thin walled metallic ribbon into tubular form and resistance welding the edges thereof as the form is advanced past a pair of electrodes engaging the respective spaced edges of the tube in advance of the point of weld and having pressure rolls for squeezing together the edges of the tube form at the point of weld, the improvement which comprises a plug supported and restrained from axial movement within the tube in the region underlying adjacent portions of the electrodes and the pressure rolls, said plug being of non-conductive material and shaped at the top and bottom to conform to the curvature of the tube, and a downwardly and rearwardly inclined surface on the top side of the plug to guide and support the adjacent edge portions of the tube as the same pass to the pressure rolls where they are brought into engagement.

2. The organization as claimed in claim 1 in which the plug is of a friction-reducing material to enable the tube to pass freely thereover.

3. The organization as claimed in claim 1, and means for imparting axial adjusting movement to the plug.

4. The organization as claimed in claim 1 in which the opposite sides of the plug are free from contact with the tube.

5. The organization as claimed in claim 1 in which the plug consists of a molded composition of wood fibers bonded by a phenolic resin.

6. The organization as claimed in claim 1 in which the angularity of the downwardly inclined plug surface is 2° for a tube four inches in diameter and with a wall thickness of the order of sixty-five thousandths of an inch.

References Cited in the file of this patent

UNITED STATES PATENTS

| | | |
|---|---|---|
| 2,004,787 | Gillette | June 11, 1935 |
| 2,417,594 | Fleche | Mar. 18, 1947 |
| 2,496,188 | Wiese | Jan. 31, 1950 |